Aug. 3, 1954  S. RODDA  2,685,531
LIGHT-SENSITIVE ELECTRON-EMISSIVE ELECTRODE
Filed June 13, 1949
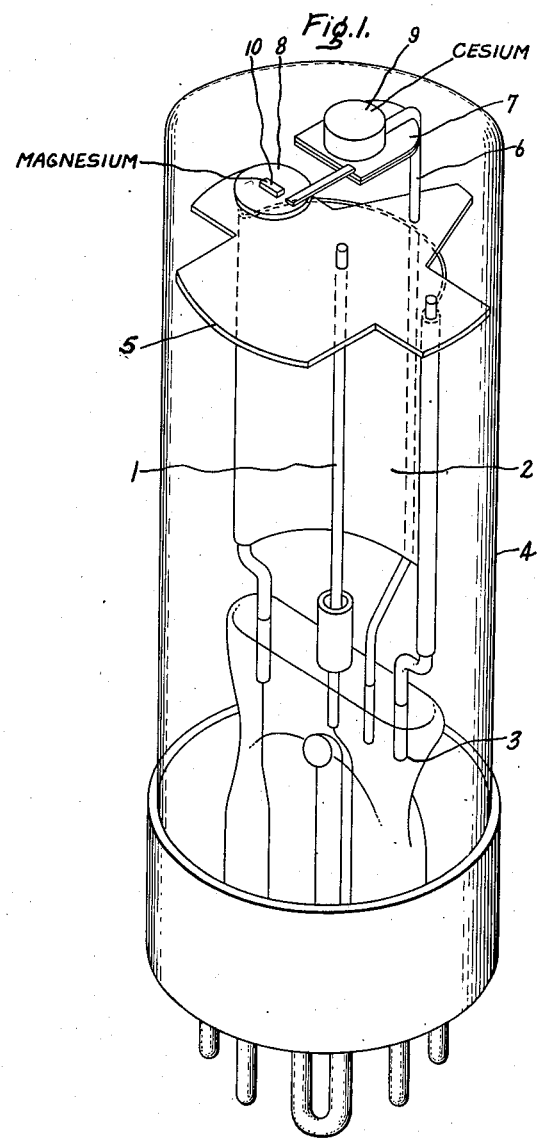
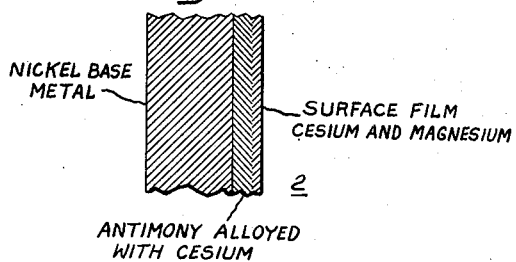
Inventor:
Sidney Rodda,
by Merton D. Morse
His Attorney.

Patented Aug. 3, 1954

2,685,531

UNITED STATES PATENT OFFICE 2,685,531

LIGHT-SENSITIVE ELECTRON-EMISSIVE ELECTRODE

Sidney Rodda, New Barnet, England, assignor to General Electric Company, a corporation of New York Application June 13, 1949, Serial No. 98,886

Claims priority, application Great Britain June 28, 1948

2 Claims. (Cl. 117—33.23)

This invention relates to the manufacture of photo-emissive devices such as photo-electric cells, electron multipliers having photo-electric cathodes, iconoscopes, and the like. In such devices the photo-emissive electrode surface is usually formed by vaporising a first metal on to a supporting element and then vaporising a second metal on to the first metal, the two metals usually combining to form a compound having photo-emissive properties. For example a cesium-antimony layer may be formed by first vaporising antimony on to a supporting metal sheet in vacuo and then distilling cesium vapour on to the antimony. As a result it is supposed that the intermetallic portion $Cs_3Sb$ is formed which possesses great photo sensitivity in the blue portion of the spectral range.

The invention is also applicable to other alloys in which for instance, tin, lead or bismuth are employed as the first metal and rubidium for instance is employed as the second metal, that is in place of the cesium.

The present invention is based on the discovery that the addition of a vaporisable metal such as magnesium, barium or aluminum to such electrode surfaces increases the photo-sensitivity, for example in the case of the cesium-antimony alloy the addition of one of these metals was found to increase the photo-sensitivity by a factor of at least 2. Such a result was not expected since a similar treatment in the case of the conventional cesium oxide on silver cathode is followed by a marked degradation in photo-electro properties.

According to the present invention in the manufacture of photo-emissive devices of the kind above referred to a vaporising metal such as magnesium, barium or aluminum is introduced in the envelope of the device which is sealed and heated in vacuo so as to cause the vaporising metal to vaporise and deposit on the emissive electrode. Such step may be either carried concurrently with the deposition of the second metal, for example cesium or before and after such deposition.

By way of example the invention may be carried out in the following manner:

A thin layer of antimony is evaporated in vacuo on to a nickel sheet, which has been fabricated in the form of a cathode. This is then mounted on a stem, on which are also disposed the anode and a support which carries the cesium getter pellet and a nickel disc to which is welded a small strip of magnesium. A mica disc is mounted in such a way that magnesium subsequently evaporated does not entirely cover the bulb walls but leaves a clear window for access of light to the photo cathode.

The electrode structure is sealed into a glass envelope, and the cell is exhausted and baked in the usual manner, and then allowed to cool. The cesium getter pellet (containing for example an intimate mixture of cesium chromate and silicon powder) and the disc holding the magnesium are then heated simultaneously by eddy current heating while the electrode structure is held at a temperature of approximately 300° C. The cesium is liberated and the magnesium vaporised. Cesium is thereby liberated and at a temperature of 300° C. it has a vapor pressure of approximately 3 microns so that it diffuses throughout the envelope and reacts with the antimony to form an alloy with the antimony which is commonly regarded as cesium antimonide ($Cs_3Sb$). If sufficient cesium is present it will convert all of the antimony into cesium antimonide, which may be properly described as an intermetallic alloy. In the case of a preferred embodiment of the photo-emissive surface of my invention, sufficient cesium is present so that all of the antimony alloys with the cesium. The cell is then baked at a temperature 100°–200° C., whilst still continuing the exhaust, until the photo-emission reaches a maximum value or until electrical leakage currents disappear, and finally the cell is sealed-off. At 300° C. the vapor pressure of the magnesium is approximately $10^{-4}$ microns, which although small, is sufficient to build several atomic layers per second on a surface on which the vapor falls, the condensation rate per square centimeter per second being calculated to be approximately 1 microgram. At the lower bake-out temperature of 100–200° C. the vapor pressure of magnesium is approximately one-thousandth the pressure at 300° C. At this lower bake-out temperature, an atomic layer can fall on a surface in 1½ minutes. Therefore, in the usual reaction time of approximately 15 minutes a number of atomic layers of magnesium can form on the photo-sensitive surface thereby forming a surface film of cesium and magnesium.

A photo-electric cell embodying my invention is shown in Fig. 1 of the drawing and an enlarged section of the photo-cathode is illustrated in Fig. 2. Referring now to the drawing an anode 1 in the form of an elongated conductor is supported in spaced and insulated relation facing the concave surface of a curvilinear photo-cathode 2. The anode 1 and cathode 2 are supported from the press 3 of a conventional vacuum tube envelope 4. The upper ends of the anode 1 and cathode 2 are supported by a mica spacer member 5. A vertically extending supporting rod 6 is sealed into the press 3 and extends through and above the mica spacer 5 to provide a support for metal tabs 7 and 8 on which are mounted respectively a cesium getter pellet 9 and a magnesium strip 10. It is apparent that this device may be constructed in accordance with the method described in detail in the preceding two paragraphs of the specification.

In Fig. 2, the enlarged sectional view shows the nickel base member of the photo-cathode with the intermediate layer of antimony alloyed with cesium and the surface cesium film with the magnesium atoms.

The invention is not confined to combination of cesium with antimony, but may be utilised when rubidium replaces the cesium, or bismuth the antimony, or when a substrate metal other than nickel is employed. It is also to be understood that the invention is not restricted to vacuum photo-cells, but that the method may be advantageously employed for photo-multipliers and other photo-electric devices.

What I claim as new and desire to secure by Letters Patent of the United States is:

1. A photo-emissive element comprising a base member having on a surface thereof a layer of material selected from the group consisting of antimony and bismuth, a layer thereon of a metal selected from the group consisting of cesium and rubidium and including a small quantity of a metal selected from the group consisting of magnesium and barium.

2. A photo-emissive element comprising a nickel base member having a surface portion thereof containing antimony and an overlying layer of cesium including an outer surface of cesium and magnesium.

References Cited in the file of this patent

UNITED STATES PATENTS

| Number | Name | Date |
|---|---|---|
| 1,955,335 | Knowles | Apr. 17, 1934 |
| 2,210,683 | Maurer | Aug. 6, 1940 |
| 2,401,736 | Janes | June 11, 1946 |
| 2,432,657 | Colbert et al. | Dec. 16, 1947 |